(12) United States Patent
Zhou et al.

(10) Patent No.: US 11,340,131 B2
(45) Date of Patent: May 24, 2022

(54) MULTI-HOLE PROBE PRESSURE SENSORS

(71) Applicant: University of Florida Research Foundation, Incorporated, Gainesville, FL (US)

(72) Inventors: Haocheng Zhou, Gainesville, FL (US); Mark Sheplak, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 86 days.

(21) Appl. No.: 16/640,344

(22) PCT Filed: Oct. 19, 2018

(86) PCT No.: PCT/US2018/056663
§ 371 (c)(1),
(2) Date: Feb. 19, 2020

(87) PCT Pub. No.: WO2019/079689
PCT Pub. Date: Apr. 25, 2019

(65) Prior Publication Data
US 2020/0355569 A1  Nov. 12, 2020

Related U.S. Application Data

(60) Provisional application No. 62/574,871, filed on Oct. 20, 2017.

(51) Int. Cl.
*G01L 23/16* (2006.01)
*G01L 23/14* (2006.01)

(52) U.S. Cl.
CPC .............. *G01L 23/16* (2013.01); *G01L 23/14* (2013.01)

(58) Field of Classification Search
None
See application file for complete search history.

(56) References Cited

U.S. PATENT DOCUMENTS 5,385,053 A   1/1995  Wlodarczyk et al.
6,738,145 B2  5/2004  Sherrer et al.
(Continued)

OTHER PUBLICATIONS

Senko Advanced Components, FC Premiumn Connector Product Sheet. Created May 9, 2017. Retrieved Dec. 17, 2021. (Year: 2017).*

(Continued)

*Primary Examiner* — Paul M. West
*Assistant Examiner* — Mark A Shabman
(74) *Attorney, Agent, or Firm* — Alston & Bird LLP

(57) ABSTRACT

Systems, methods, and apparatuses for taking pressure measurements are provided. A multi-hole pressure sensor probe can include a probe tip having a plurality of probe tip holes. The probe tip holes can lead to probe tip channels that convey fluid from the measurement environment to pressure transducers. The pressure transducers can operate using optical transduction techniques. A light source can be applied to the diaphragm, and the light reflected from the diaphragm changes as the position of the diaphragm changes. Further, a reflective material can be applied on the backside of the diaphragm to increase its reflective properties. The light can then be collected and analyzed using a photodiode to determine the environmental pressure acting on the different holes of the probe.

32 Claims, 10 Drawing Sheets

(56) References Cited

U.S. PATENT DOCUMENTS

| | | | |
|---|---|---|---|
| 6,782,109 B2 | 8/2004 | Sheplak et al. | |
| 7,460,740 B2 | 12/2008 | Lagakos et al. | |
| 2005/0041905 A1* | 2/2005 | Lagakos | G01L 7/086 |
| | | | 385/12 |
| 2010/0107774 A1* | 5/2010 | Kurtz | G01L 15/00 |
| | | | 73/754 |
| 2012/0048023 A1* | 3/2012 | Kurtz | G01L 19/0084 |
| | | | 73/727 |
| 2013/0084045 A1* | 4/2013 | Aoki | G02B 6/3576 |
| | | | 385/92 |

OTHER PUBLICATIONS

International Searching Authority, International Search Report and Written Opinion for International Application No. PCT/US2018/056663, dated Jan. 31, 2019, (11 pages), U.S. Patent and Trademark Office, USA.

\* cited by examiner a)

b)

c)

d)

e)

US 11,340,131 B2

MULTI-HOLE PROBE PRESSURE SENSORS

CROSS-REFERENCE TO RELATED APPLICATIONS

The present application claims priority to International Application No. PCT/US2018/056663 filed on Oct. 19, 2018 and U.S. provisional patent application No. 62/574,871 filed on Oct. 20, 2017, the content of which is incorporated herein by reference in its entirety.

TECHNICAL FIELD

The present application relates to MEMS devices, and in particular, to a pressure sensor device.

BACKGROUND

Experimental fluid measurements continue to play an important role in understanding fluid mechanics. However, there are still many problems to solve in the current technology, these issues include pneumatic lag effects and other measurement inaccuracies. Further, there is a demand for reduced size pressure sensors, especially those that can take multiple pressure measurements at a point in space.

Traditional multi-hole probes (MHPs) transmit pressure signals from the probe tip holes to the transducers via long pneumatic tubes. This causes pneumatic lag. Pneumatic lag can lead to inaccurate and delayed results, and can increase the time required to perform experimental analysis. Further, pneumatic lag can make it difficult or even impossible to detect high frequency pressure perturbations.

Thus, there is a need to create a solid state light weight pressure sensor.

BRIEF SUMMARY

Embodiments of the present invention provide methods and apparatuses for measuring fluid pressure. More specifically, embodiments of the present invention include multi-hole probe (MHP) pressure sensors and optical lever based pressure sensors arrays. Embodiments of the present invention can reduce pneumatic lag in pressure measurements and reduce pressure sensor size.

In an embodiment, a multi-hole probe pressure sensor can include a probe tip having a plurality of probe tip holes on the top surface, each hole is connected to a probe tip tube that conveys fluid from the measurement environment to pressure transducers. Each of the probe tip tubes has a depth and penetrates an entire depth of the probe tip. Each probe tip tube has a narrower upper portion and a wider lower portion.

The pressure transducers can operate using optical-lever based techniques and other optical transduction mechanisms.

That is, pressurized fluid from the probe tip channel can apply force to a diaphragm located within the probe (in some embodiments, more than one diaphragm can be used). A light source can be applied to the diaphragm, and the light reflected from the diaphragm changes as the position of the diaphragm changes. Further, a reflective material can be applied on the backside of the diaphragm(s) to increase the reflective properties thereof. The light can then be collected and analyzed using a photodiode to determine the environmental pressure acting on the different holes of the probes.

The pressure probes can include a sensor die that is attached to the probe tip and has a plurality of die channels. Each die channel can include an optic fiber cable or other connections for transmission of EM waves to the rear-facing part of the diaphragm(s). The diaphragm(s) can be located between each of the plurality of die channels and each of the plurality of probe tip tubes. In many embodiments, a plurality of diaphragms can be used, and the center of the diaphragms can align respectively with the center of both the die channel and the probe tip tube.

A probe housing can include the sensor die and the probe tip. The optic cables can run through the probe housing and back to connect with a photodiode and an electromagnetic radiation source, for example, a LED, or a laser diode emitting a visible light, ultraviolet wave, or infra-red wave. The photodiodes can be remotely located away from the environment of the probe tip. The photodiodes can be connected to acquisition hardware that processes the electrical signals from the photodiode, which represent the deflection of the diaphragm due to the pressures acting on the probe tip.

Embodiments of the present invention are able to reduce pneumatic lag by moving the pressure measurement diaphragm(s) closer to the probe tip. However, using optical fiber, the sensitive electronic components can be positioned away from the measurement environment. Therefore, the techniques of the present invention can be used to create MHPs with low pneumatic lag, fast response times, small form factors, and the ability to operate in harsh environments.

Embodiments of the present invention can be used in the aviation, automotive, and power generation industries. For example, embodiments of the present invention can be used in wind-tunnel test flows. Fast-response measurements can considerably reduce the running period of wind tunnels, which increases efficiency and reduces operating costs.

Embodiments of the present invention can provide robust performance in high pressure, high shock, and extreme temperature applications. Embodiments (e.g., commercial embodiments) can be produced using microelectromechanical systems (MEMS) fabrication techniques including semiconductor microfabrication techniques, laser micromachining, probe tip bonding, and back-cavity fiber positioning. A single die can include multiple pressure sensors. The pressure sensors can take multiple measurements, including the fluid velocity vector (including magnitude and angularity) as well as static and dynamic pressures.

DETAILED DESCRIPTION

Embodiments of the present disclosure provide multi-hole probes (MHPs) and pressure measurement techniques. Multi-hole probes (e.g., five-hole probes or 5HPs, seven-hole probes, or more holes probes) are infield flow measurement tools designed to take point measurements at the probe tips when immersed in a flow field of a gas or liquid. The instantaneous three-dimensional velocity vectors (i.e., velocity magnitudes and directions) and the local static and total stagnation pressure can be determined at the measurement points. The pressure sensors can have improved spatial and temporal resolution due to their reduced size and low pneumatic lag. The reductions of size and pneumatic lag are possible as a result of the novel designs and pressure measurement techniques disclosed in this invention.

The present invention will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1A:
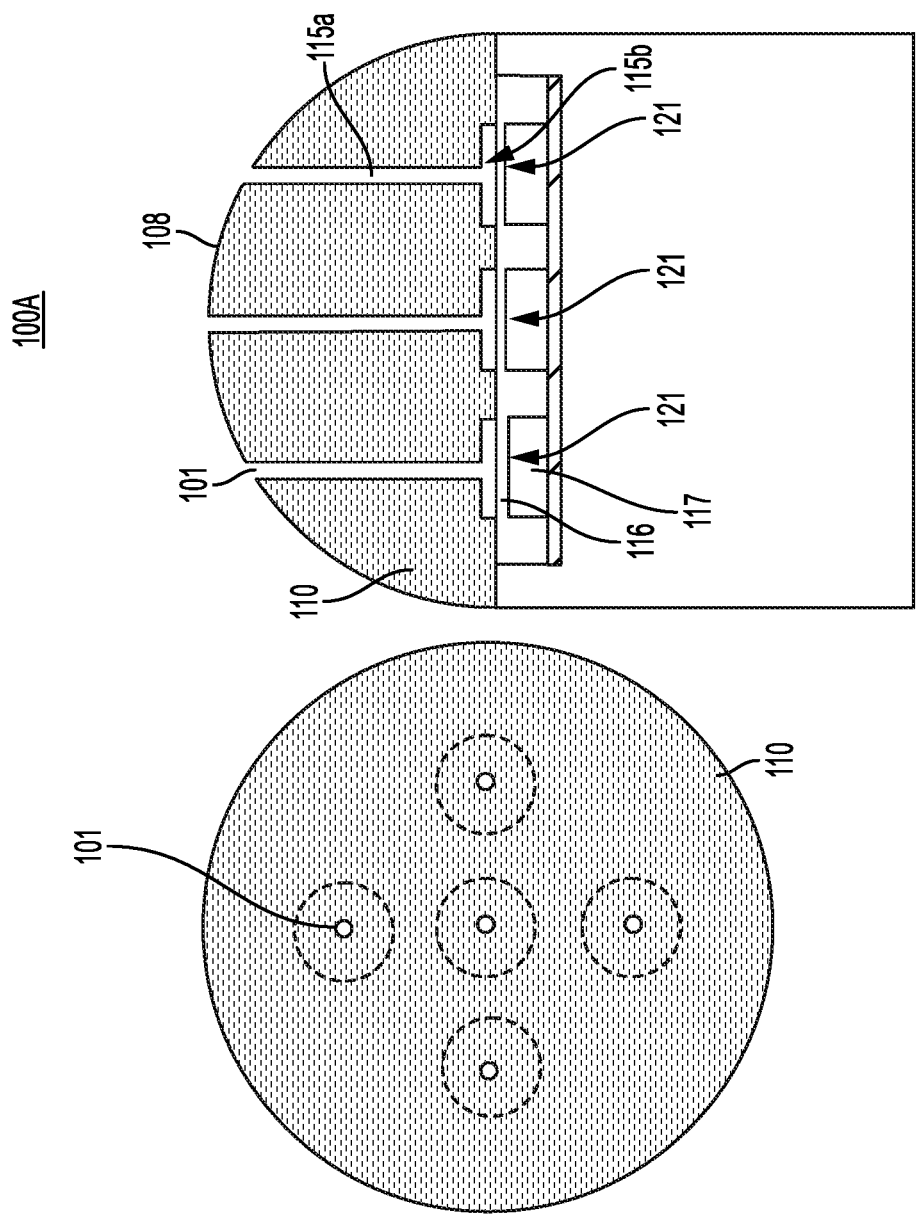
FIG. 1a and FIG. 1b show hemisphere-tipped probes with embedded pressure transducers according to an embodiment of the present invention
Figure 1B:
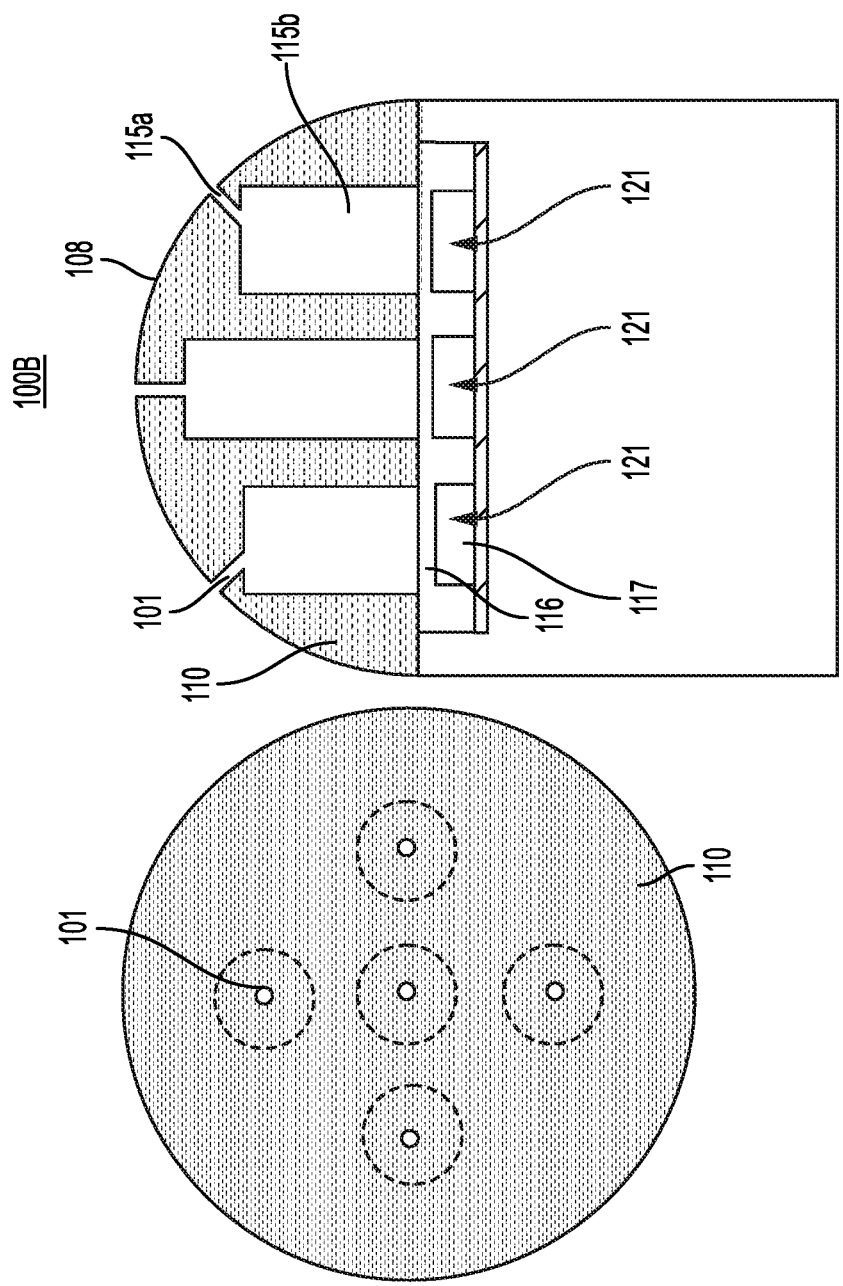

FIGS. 1a and 1b shows a hemisphere-tipped five-hole probe (5HP) with embedded pressure transducers 100a and 100b according to an embodiment of the present invention. The five holes 101 serve as pressure ports to transmit the pressure from the surface of the probe front (or cap) 110 to pressure transducers 121. The probe tip 110 can take a variety of shapes. For example, the probe tip 110 can be hemisphere shaped, cone shaped, elliptically shaped, or pyramid shaped. The pressure transducers 121 are in fluid communication with the probe front 110 of the multi-hole probe (MHP) by way of probe tip tubes 115a, which can conduct gas or liquid from the probe tip surface 108. The pressure transducers 121 can each include a diaphragm 116 and a cavity 117. The tip tube diameter can have different widths. FIG. 1a 100a shows a narrower tube design and FIG. 1b 100b shows a two width tube design. Although the embodiments shown in the Figures are described with reference to a probe with five holes, it is understood that a probe, in accordance with embodiments of the present invention, may have fewer or more holes.

Figure 2A:
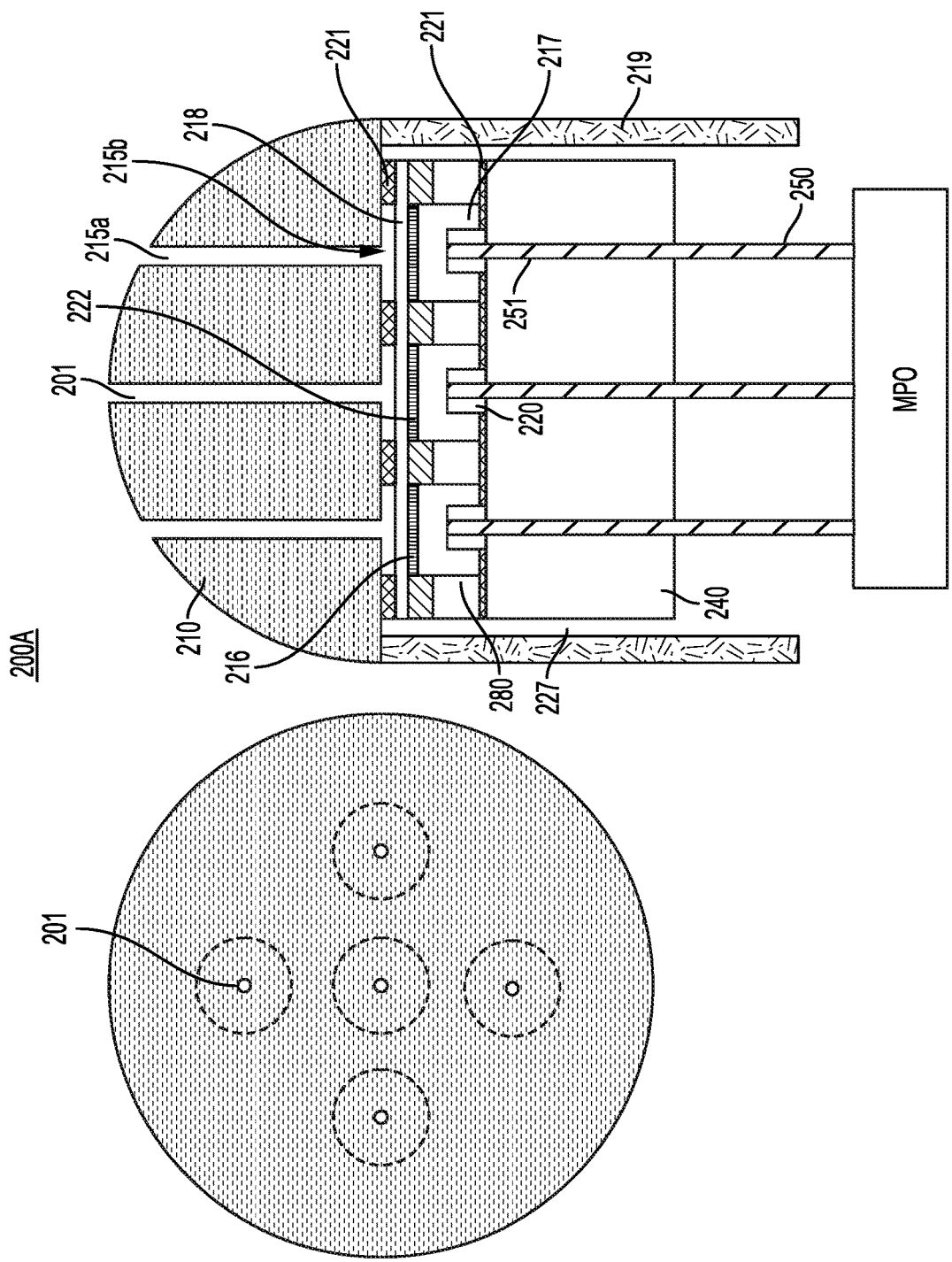
FIG. 2a and FIG. 2b show hemisphere-tipped probes according to an embodiment of the present invention.
Figure 2B:
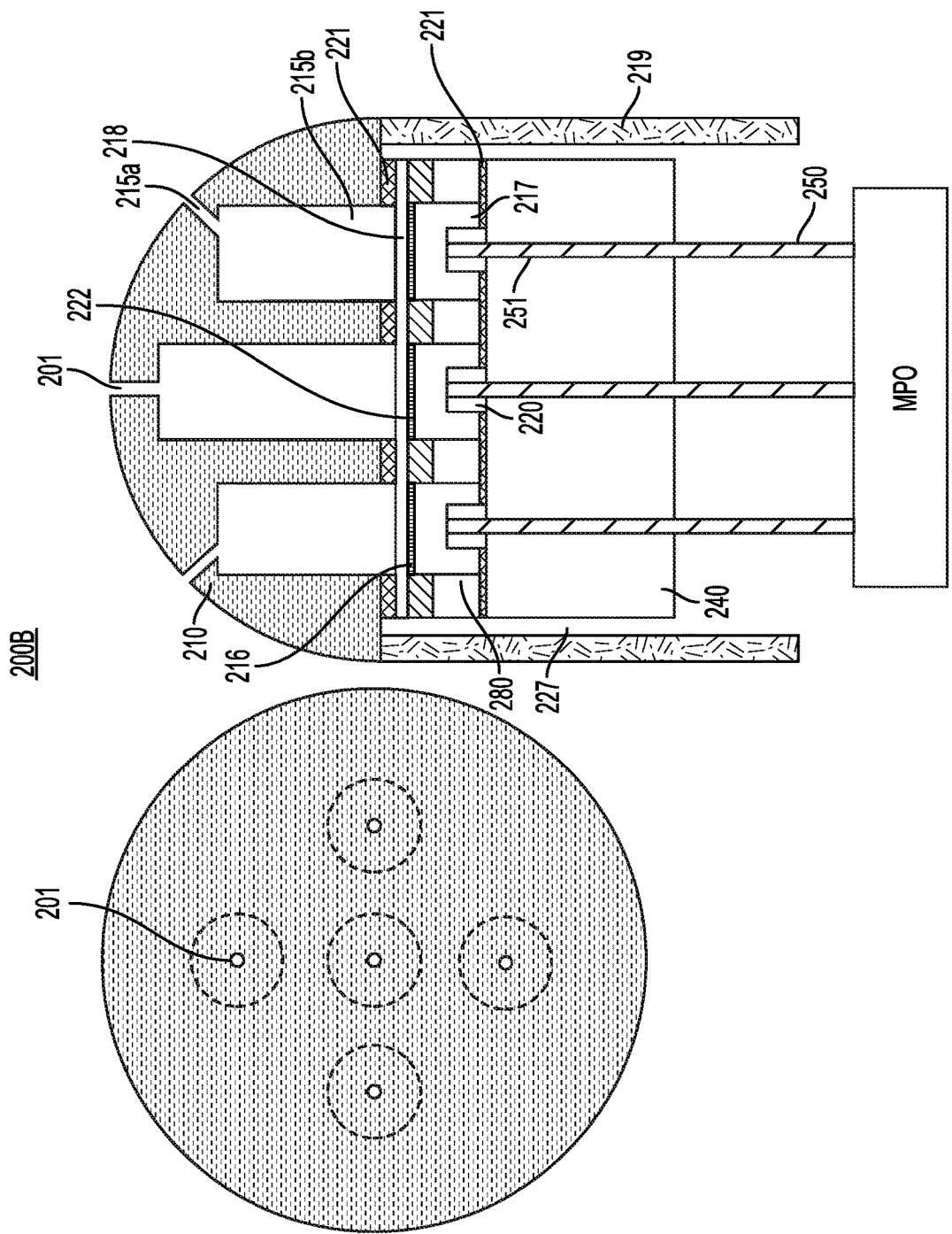

FIGS. 2a and 2b show hemisphere-tipped five-hole (5HP) probe according to an embodiment of the present invention, specifically highlighting the bonding of the sensor die 280 to the probe tip 210 and the multi-fiber ferrule 240. The probe tip 210 can include a plurality of holes 201 in FIG. 2a and FIG. 2b. FIG. 2a (200a) shows a tube 215a with a thin wider portion at the bottom. FIG. 2b (200b) shows an upper tube portion 215a connecting to a wider lower tube portion 215b. The bottom of each of the tubes leads to a diaphragm 218 so the pressurized fluid can fully act on the diaphragm 218. The probe tip tubes 215a, 215b together form a Helmholtz resonator, which dictates the resonant frequency and settling time in transmitting pressure from probe surface 108 to diaphragm 218. Electromagnetic (EM) radiation such as light (e.g., ultraviolet, visual spectrum, or infrared waves) can act on the back side of the diaphragm 218 forming an optic lever. That is, when the diaphragm 218 is displaced, the light being reflected off of the diaphragm 218 changes and these changes can be measured to determine diaphragm 218 position. In addition, a layer of reflective material 216 and 222 can be applied to the bottom of the diaphragm 218 to enhance the reflecting of light as the diaphragm 218 is displaced. The diaphragm 218 position can then be used to determine the pressure coming from each hole of 201 of the probe tip 210.

The multi-hole probe 200a and 200b can include a sensor die 280 and a multi-fiber ferrule 240. The sensor die 280 can be connected to the probe tip 210 and the multi-fiber ferrule 240 by using an intermediate bonding layer 221, such as an epoxy film, a eutectic metal layer or a glass frit layer. The multi-fiber ferrule 240 can include a plurality of sensor die channels (or ferrule channels) 251. The sensor die channels 251 can provide a space for fiber optic cables 250, which transmit light to the diaphragm 218 from an EM radiation source such as a LED or a laser (not shown). The optic cables 250 can also collect light reflected off from the diaphragm 218 to a remotely located photodiode (not shown) that receives, characterizes, and quantifies the reflected light.

The multi-fiber ferrule 240 and the sensor die 280, can be placed within a probe housing 219. The optic cables 250 can run through the probe housing 219 and back to connect with a photodiode in addition to the EM source. This allows the sensitive optical and electronic components to be located away from the environment of the probe tip 210. A multi-fiber push on (MPO) can be used to connect the bundle of optical fibers 250 to the probe, specifically the sensor die. The photodiodes can be connected to an electric circuit and an acquisition hardware (now shown) that processes the electrical signals from the photodiode, which represents the deflection of the diaphragm 218 due to the pressures acting on the probe tip 210.

The sensor die 280 can be formed using semiconductor and MEMS fabrication techniques. The sensor die 280 can include a cavity 217 beneath the diaphragm(s) 218, thereby providing a transducer comprising the diaphragm 218 and the cavity 217. The cavity 217 can be hermetically sealed or can have a vent (not shown) to the measurement environment, which may be particularly useful in dynamic pressure measurement applications. The optic cables 250 can terminate at the base of the cavity 217 or can penetrate into the cavity 217. The ends of the optic cables 250 can be polished, or can be fitted with a ferrule step column 220, to help the accurate positioning to achieve optimum distance from the optic cable 250 to the diaphragm 218. When inserting the sensor die 280 and the multi-fiber ferrule 240 into the probe housing 219, a circumferential gap 227 can be provided around the sensor die. The circumferential gap 227 can be filled with an adhesive or a shock absorbing material such as rubber or silicone.

Figure 3:
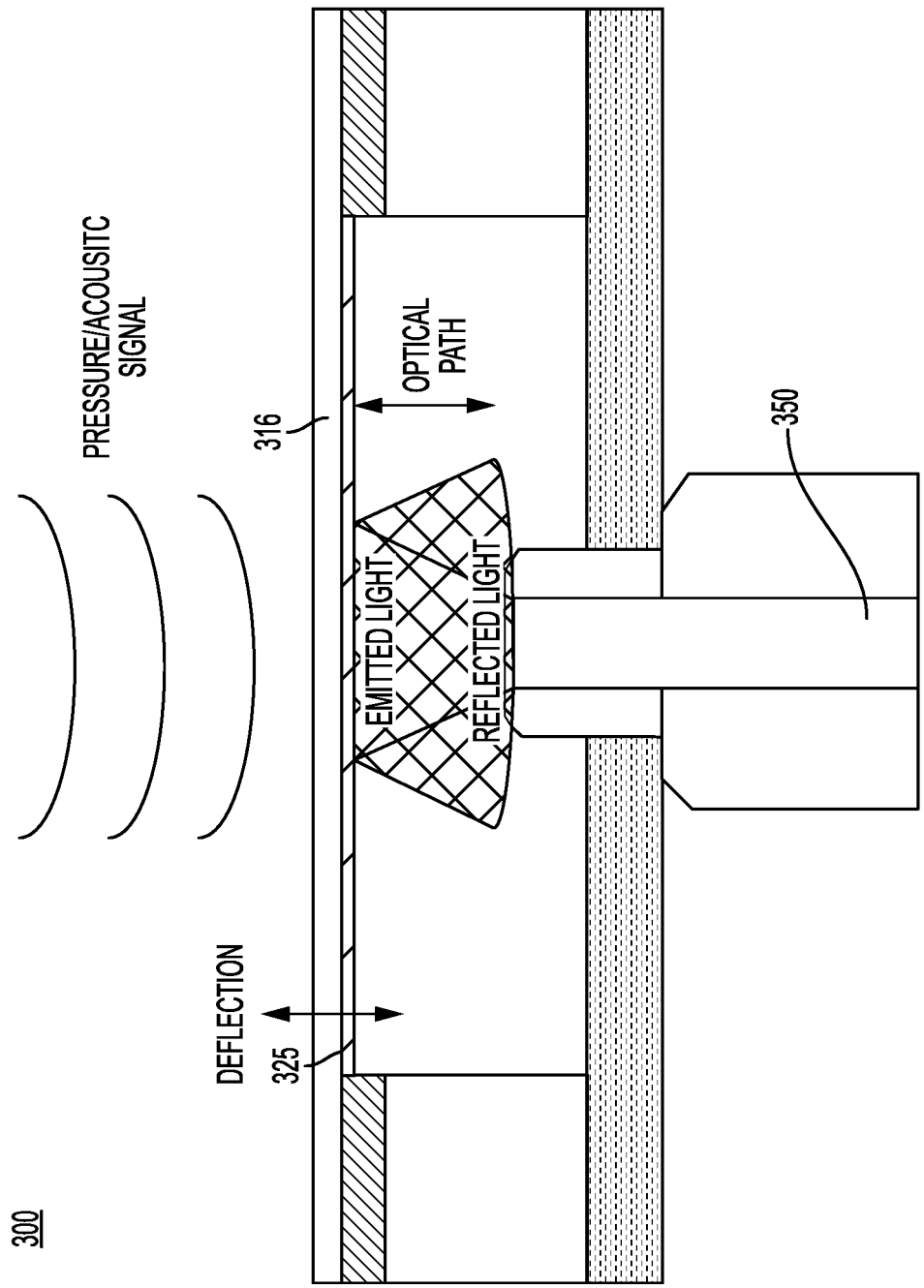
FIG. 3 shows a schematic of a MEMS pressure sensor cavity having a fiber-optic-lever according to an embodiment of the present invention.

FIG. 3 shows a close-up schematic of a MEMS pressure sensor system 300 having a fiber-optic lever transduction mechanism according to an embodiment of the present invention. Referring to FIG. 3, the acoustic pressure signal can be seen coming downwards and impacting the diaphragm 316. Light is emitted from the fiber optic cable 350 and this light reflects off of the diaphragm 316. The light is then reflected backwards and then travels back through the fiber optic cable 350. That is, one fiber can act as both the illuminating fiber and the receiving fiber.

In alternative embodiments, separate fibers can be used for illumination and receiving, and a reference fiber (serving as an optical reference for data analysis) can also be applied. A reflective material 325 can be applied to the backside of the diaphragm 316 to increase or control the reflective properties of the diaphragm. A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 4:
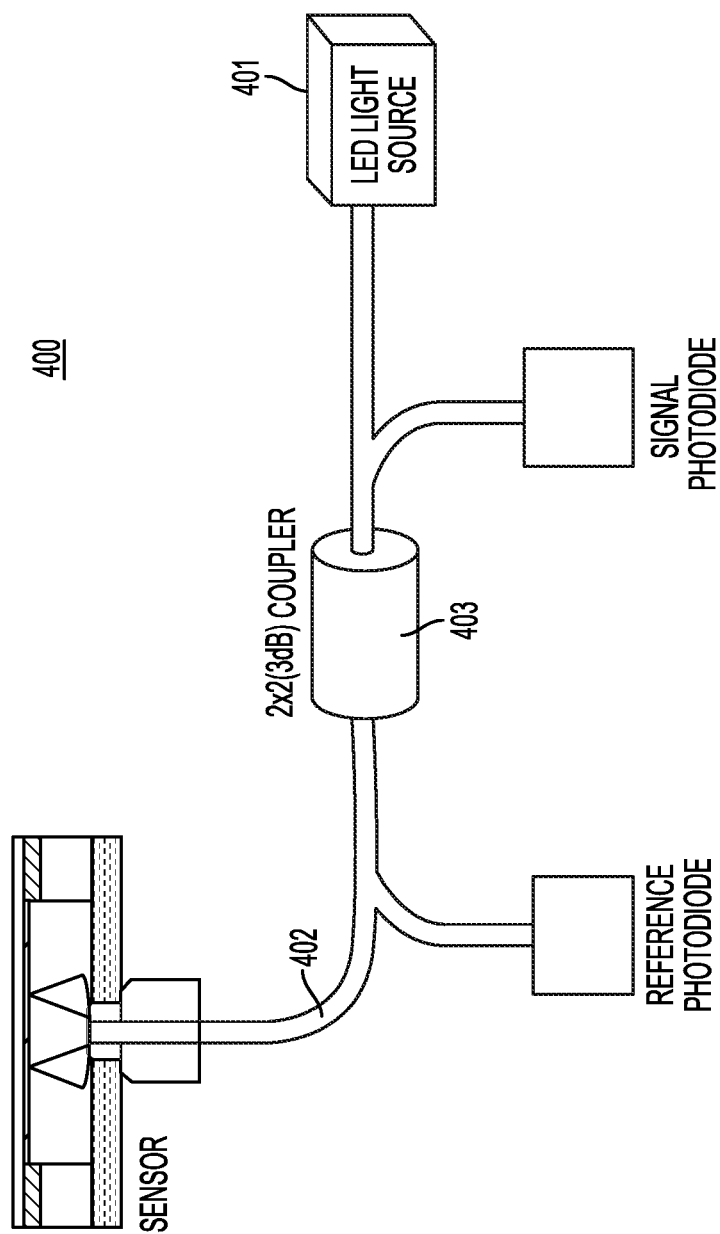
FIG. 4 shows a pressure sensor system according to an embodiments of the present invention.

Fiber-optic levers were produced and experiments were conducted to prove the concepts of embodiments of the present invention. An overview of the fiber-optic lever pressure sensor system 400 can be seen in FIG. 4. The fiber-optic lever includes a polished silicon fiber 402, an LED light source 401, a fused silica mirror at the exit of the LED light source (not shown), a 2×2 3 dB optical coupler 403, and a nano-positioner (not shown). The LED source 401 emits infrared light centered at a wavelength of 850 nm with a bandwidth of about 35 nm. The fused silica mirror has a reflectance of more than 99% for the specified wavelength range. The coupler 403 divides the light into two parts, one for the intensity measurement setup and the other for the source intensity modulation reference. The goal was to mitigate or eliminate LED light source instability. It is well known that the performance of an LED diode is subject to environmental changes, such as temperature or humidity changes. For the pressure sensor, this implies that the sensor output may alter, not due to actual pressure changes, but due to light source drift. To tackle the potential drifts from the light source and ensure proper sensor operation, the light source itself can be used as a reference. This can be accomplished by dividing the signal from the fiber-optic lever such that the instability of the light source is canceled out. To prove this concept, the fiber and the mirror were kept in a fixed position, and the actual signal output, the reference output, and their ratio was monitored for an extended period of time.

Example 2

Figure 5:
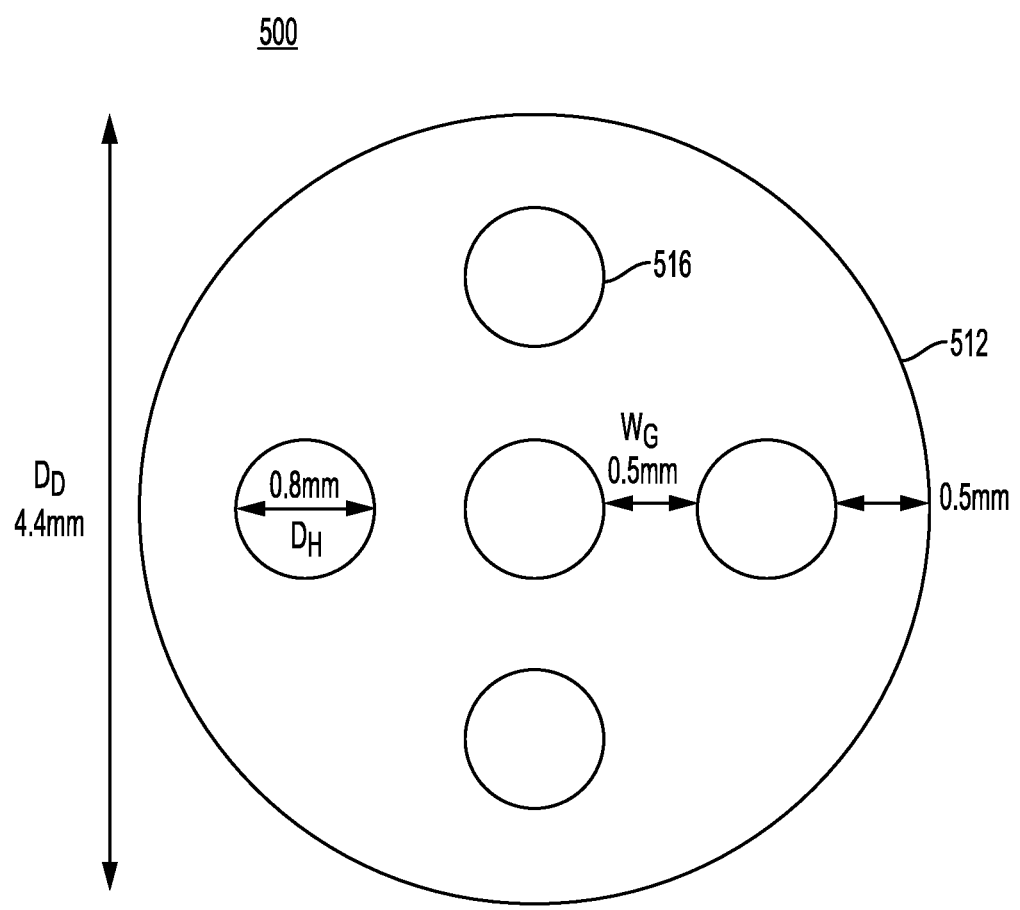
FIG. 5 shows a top view of the transducer array design layout for a die according to an embodiment of the present invention.

A die 500 was constructed to prove the concepts of embodiments of the present invention, which can be seen in FIG. 5. Multiple dies can be fabricated on one wafer. The diaphragm diameter DD can be determined based on the overall die size of the transducer array. In this example, the die size needed to be smaller than a 5 mm probe tip to fit into the tube housing during the packaging process. The die size was set to 4.4 mm to provide a 300 μm border. An 0.8 mm cavity diameter was used, which resulted in 0.5 mm minimum gaps between two diaphragms 516 as well as between each of the four outsider diaphragms and the edge 512, as shown in FIG. 5. The gap width WG was used for the bonding process to ensure good bonding strength and sealing. The hemispheric tip can be made of Pyrex. The cavities are about 850 μm in diameter. The holes/ports are about 100 μm in diameter and 500 μm in depth. All holes are drilled using laser-micromachining into the hemispheric tip perpendicularly to the hemispheric surface in order to ensure a small hole-size. Fabrication of optical-based MHPs of embodiments of the present invention can be divided into fabrication of the transducer array, packaging of the probe, and the fabrication of the photodetector circuit. After fabrication, MHPs of embodiments of the present invention can undergo both static and dynamic calibration.

Example 3

Figure 6:
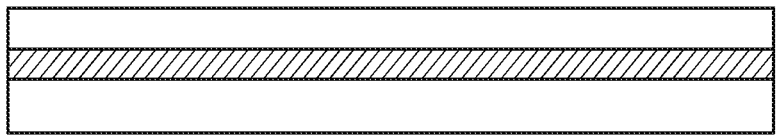
FIGS. 6(a)-6(e) show a fabrication process of a sensor die according to an embodiment of the present invention.
Figure 6:
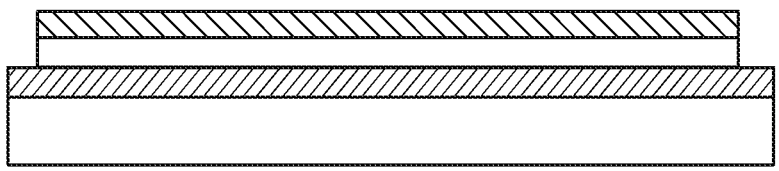
Figure 6:
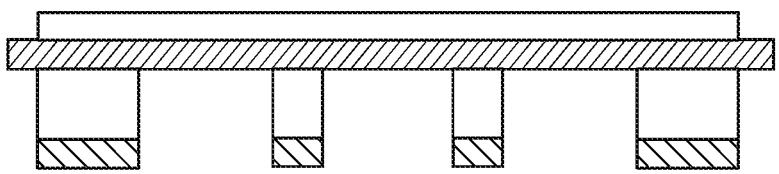
Figure 6:
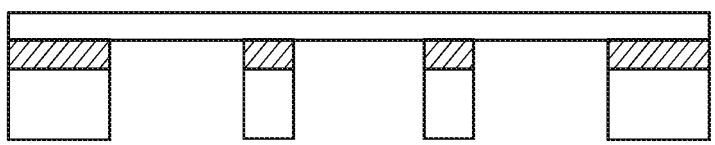
Figure 6:
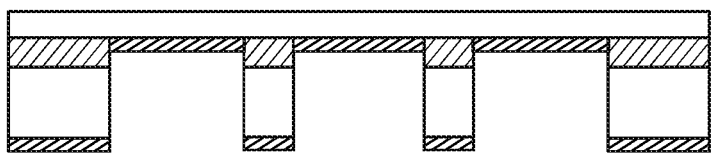

A fabrication method according to an embodiment of the present invention is shown in FIGS. 6(a)-6(e). Referring to FIG. 6, the fabrication process can start with a silicon on oxide (SOI) wafer, as shown in FIG. 6(a). A spin deposition of photoresist (PR) is followed by a lithography step with the first mask to pattern the edge of the die, followed by a deep reactive ion etching (DRIE) at the front side of the SOI wafer, as shown in FIG. 6(b).

Another step of photolithography and DRIE with the second mask, shown in FIG. 6(c), is conducted to etch the cavities and the die edge which stops at the buried oxide (BOX) layer on the back side and is aligned with the edge pattern on the front side. Next, a buffered oxide etch (BOE) is applied that removes the buried oxide layer beneath the diaphragm and at the same time etches the silicon oxide at the gap area between die edges to separate the individual dies.

The remaining photoresist is stripped in a plasma asher, resulting in the structure shown in FIG. 6(d). Next, the individual dies are mounted to a carrier (e.g., with a clamping plate) to facilitate the next steps. Sputter or evaporator is used to deposit a layer of metal, such as aluminum (Al) or gold (Au), on the backside of the wafer with a sub-micron thickness, shown in FIG. 6(e). The Al layer inside the cavity acts as a reflective mirror. Owing to its ultra-low thickness, its effect on the diaphragm deflection and the backside bonding can be ignored. The fabrication process can then be completed with plasma etching to remove residual photoresist.

The goal of the fiber fabrication process is to make a multi-mode silicon fiber array housed by a multi-fiber ferrule with protruding columns on the ferrule end and fiber connectors on the other end. The overall size of the ferrule should match with the size of the die. The positioning of the five fiber cores should be aligned with the center of the five diaphragm such that it is detecting the maximum deflection on the diaphragm. The protruding columns on the ferrule can be used to maximize the mechano-optical sensitivity. The fibers can be polished at the end of the protruding columns and attached to a Multi-fiber Push On (MPO) connector, which is connected to the rest of the optical stage. In practice, the MPO will likely be installed after the probe tip is packaged to simplify the process.

The finished fiber assembly is used in the probe packaging process. An intermediate bonding layer with holes that match with the protruding columns can be used to bond the die to the fiber array. The alignment and bonding step can be conducted with a flip-chip bonder. The thickness of the intermediate bonding layer should be taken into account in determining the column height to ensure an optimum fiber-mirror distance.

The probe tip material can be a low thermal expansion borosilicate glass such as Pyrex. The hemisphere can be acquired by milling half of 5 mm Pyrex spheres, followed by polishing the flat surface. Pressure ports/holes can be drilled on the neck of the resonator. The holes can be drilled using laser-micromachining perpendicularly to the hemispheric surface in pursuit of a small hole size that gives a more accurate point pressure measurement. The hemisphere size should be slightly larger than the sensor die such that the die and the ferrule can be fitted into a thin-wall housing tube with the same diameter of the hemispheric tip. The front side bonding of the hemispheric tip can be accomplished with the flip-chip bonder and an epoxy film. A jig can be used to hold the two pieces in place for alignment. Alignment marks on the front side can be placed when doing the front side DRIE in order to help align the tip and the sensor die. The wall thickness of the housing tube should be small enough to provide room for the sensor die and the ferrule. After the housing tube is glued to the hemisphere, the package of the probe body is complete.

Example 4

Figure 7:
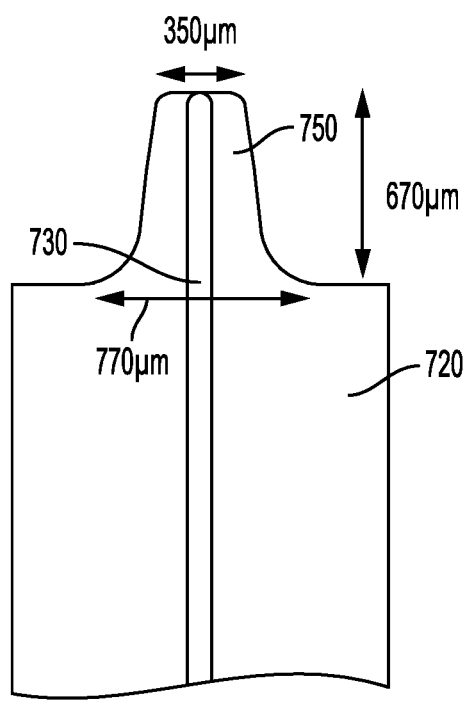
FIG. 7 shows a ferrule with a laser-micromachined step column according to an embodiment of the present invention.

FIG. 7 shows an exemplary ferrule 700 having a step-column according to an embodiment of the present invention. In this example, a LC Zirconia ferrule (OD=1.25 mm) with a laser-micromachined step column 750 (dimensions in this figure are in microns). Again, the height of the step-column 750 controls the distance between the reflective backside of the diaphragm and the optical fiber. In this example, the optical fiber cable 730 and shown in the middle of the ferrule 720.

Figure 8:
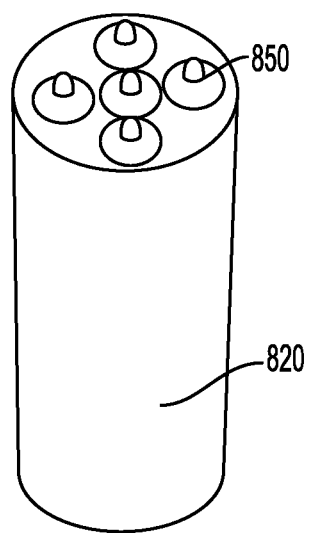
FIG. 8 shows a five-ferrule array of the pressure sensor according to an embodiment of the present invention.

FIG. 8 shows a five-ferrules array 800 of the multi-hole probe, each ferrule is like the one in FIG. 7, according to an embodiment of the present invention. It is fitted into a stainless ferrule housing tube (OD=4.4 mm) to make the fiber array for a five-hole probe. 820 is the array body and 850 is the step column of one of the ferrules. The number of the fibers/ferrules should match to the number of the diaphragms on the sensor die. It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A multi-hole probe pressure sensor, comprising:
a probe tip comprising a plurality of probe tip holes on a top surface connected to a plurality of probe tip tubes each having a length and penetrating a depth of the probe tip, wherein each of the probe tip tubes comprises a surface-proximate portion and a surface-distant portion, and wherein the surface-proximate portion has a smaller diameter than the surface-distant portion such that each probe tip tube defines a Helmholtz resonator;
a plurality of die channels containing optical fibers to transmit electromagnetic (EM) waves; and
a sensor die, arranged at a bottom surface of the probe tip, comprising a plurality of transducers each transducer corresponding to a respective one of the plurality of probe tip tubes and each transducer comprising a diaphragm positioned over and spanning across a cavity, wherein the diaphragm is centrally aligned with and connects to the respective one of the probe tip tubes, and wherein the cavity encloses one of the plurality of die channels;
wherein a deflection of the diaphragm triggers a signal change in the EM waves.

2. The pressure sensor according to claim 1, further comprising a probe housing that receives the sensor die and a multi-fiber ferrule enclosing the plurality of die channels.

3. The pressure sensor according to claim 2, further comprising an intermediate bonding layer connecting the probe tip to the sensor die and connecting the sensor die to the multi-fiber ferrule.

4. The pressure sensor according to claim 3, wherein the intermediate bonding layer is an epoxy.

5. The pressure sensor according to claim 3, wherein the intermediate bonding layer is a polymer.

6. The pressure sensor according to claim 3, wherein the intermediate bonding layer is a eutectic metal layer.

7. The pressure sensor according to claim 3, wherein the intermediate bonding layer is a glass frit layer.

8. The pressure sensor according to claim 2, wherein the multi-fiber ferrule includes a plurality of ferrule step-columns each protruding into the cavity of one of the plurality of transducers.

9. The pressure sensor according to claim 8, wherein the plurality of ferrule step-columns are connected to the plurality of die channels.

10. The pressure sensor according to claim 1, wherein the diaphragm defines a backside surface upon which comprises reflective material.

11. The pressure sensor according to claim 1, wherein the probe tip is in a hemisphere shape.

12. The pressure sensor according to claim 1, wherein the probe tip is in a cone shape.

13. The pressure sensor according to claim 1, wherein the probe tip is in a pyramid shape.

14. The pressure sensor according to claim 1, wherein the probe tip is in an elliptical shape.

15. The pressure sensor according to claim 1, wherein the diaphragm comprises silicon.

16. The pressure sensor according to claim 1, wherein the diaphragm comprises sapphire.

17. The pressure sensor according to claim 1, wherein the optical fibers are multi-mode fibers.

18. The pressure sensor according to claim 1, wherein the optical fibers are single-mode fibers for measuring optical interference signal from the deflection of the diaphragm.

19. A multi-hole probe pressure sensor, comprising:
a multi-fiber ferrule including a plurality of die channels, each enclosing optical fibers to transmit EM waves;
a sensor die comprising a plurality of transducers attached to the multi-fiber ferrule, wherein each of the plurality of transducers corresponds to a respective one of the plurality of probe tip tubes and each comprising a diaphragm positioned over and spanning across a cavity; and
a probe tip including a plurality of probe tip tubes inside the tip and attaching to the sensor die;
wherein each of the plurality of transducers connects to one of the plurality of probe tip tubes and one of the plurality of die channels; and
wherein each of the plurality of probe tip tubes comprises a surface-proximate portion and a surface-distant portion, wherein the surface-proximate portion has a smaller diameter than the surface-distant portion such that each probe tip tube defines a Helmholtz resonator.

20. The pressure sensor according to claim 19, wherein the multi-fiber ferrule includes a plurality of ferrule step-column aligned to the plurality of die channels.

21. The pressure sensor according to claim 20, wherein the plurality of ferrule step-columns are located in the cavity of each of the plurality of transducers.

22. The pressure sensor according to claim 21, further comprising a plurality of optical fiber cables each passing through one of the plurality of die channels and one of the plurality of ferrule step-columns.

23. The pressure sensor according to claim 22, wherein the plurality of optical fiber cables each protrude into said cavity of one of the plurality of transducers.

24. The pressure sensor according to claim 22, wherein the plurality of optical fiber cables each comprises single-mode optical fibers to provide optically interfering signals from the transducers.

25. The pressure sensor according to claim 22, further comprising a plurality of ferrule core connectors (FC) or a plurality of other types of optical connectors connected to the plurality of cables.

26. The pressure sensor according to claim 22, further comprising a multi-fiber push on (MPO) connector connected to the plurality of optical fiber cables.

27. The pressure sensor according to claim 22, further comprising a probe housing surrounding the sensor die and the multi-fiber ferrule, and disposed on the probe tip.

28. The pressure sensor according to claim 19, wherein the optical fibers are multi-mode fibers.

29. The pressure sensor according to claim 19, wherein the optical fibers are single-mode fibers.

30. The pressure sensor according to claim 19, wherein the sensor die is made on a SOI wafer, the cavity is surrounded by a backside silicon of the SOI wafer and a buried oxide of the SOI wafer, and the diaphragm is made of a front side silicon of the SOI wafer.

31. The pressure sensor according to claim 30, wherein the probe housing has a hemisphere shape and seals the probe tips.

32. The pressure sensor according to claim 10, further comprising a reflective material disposed on the diaphragm facing the cavity.

* * * * *